(12) United States Patent
Canfield

(10) Patent No.: US 6,491,071 B1
(45) Date of Patent: Dec. 10, 2002

(54) SELF-LEVELING SEMI-AUTO-ELEVATING WORK-PIECE FEED SUPPORT MECHANISM FOR USE WITH A HEIGHT-ADJUSTABLE WORK SUPPORT IN A FRAME-MOUNTED SAW OR THE LIKE

(76) Inventor: James E. Canfield, 1420 S. Pacific Ave., Kelso, WA (US) 98626

( * ) Notice: Subject to any disclaimer, the term of this patent is extended or adjusted under 35 U.S.C. 154(b) by 0 days.

(21) Appl. No.: 09/916,813

(22) Filed: Jul. 27, 2001

(51) Int. Cl.[7] .............................................. B25H 1/00
(52) U.S. Cl. ..................... 141/287; 144/1.1; 108/147
(58) Field of Search ........................ 144/287, 286.5, 144/1.1, 286.1; 108/147, 145, 144.11; 83/477.2; 248/58, 59, 332, 325, 324, 642, 644

(56) References Cited

U.S. PATENT DOCUMENTS

| | | | |
|---|---|---|---|
| 1,104,735 A | 7/1914 | Morris | |
| 1,112,729 A | 10/1914 | Swanson | |
| 1,395,847 A | * 11/1921 | Lorey | 144/287 |
| 1,429,926 A | 9/1922 | Carre | |
| 1,583,879 A | * 5/1926 | Hallock et al. | 144/129 |
| 3,282,566 A | * 11/1966 | Clarke | 108/147 |
| 3,848,647 A | 11/1974 | Fell | 144/3 R |
| 3,903,425 A | 9/1975 | Sweeney et al. | 250/515 |
| 3,994,190 A | 11/1976 | Bagley | 83/157 |
| 4,068,551 A | 1/1978 | Kreitz | 83/471.3 |
| 4,328,846 A | 5/1982 | Hanson | 144/287 |
| 4,516,453 A | 5/1985 | Parham, Jr. | 83/471.3 |
| 4,559,879 A | * 12/1985 | Hausser | 108/136 |
| 4,563,926 A | 1/1986 | Boardman | 83/107 |
| 4,726,404 A | 2/1988 | Bassett | 144/287 |
| 4,753,279 A | * 6/1988 | Harris | 144/287 |
| 4,830,076 A | * 5/1989 | Feyer | 144/286.5 |
| 4,852,623 A | 8/1989 | Rodriques | 144/287 |
| 4,874,025 A | 10/1989 | Cleveland | 144/287 |
| 5,273,090 A | 12/1993 | Klemma | 144/134 R |
| 5,289,782 A | * 3/1994 | Rizzi et al. | 108/146 |
| 5,379,815 A | 1/1995 | Brazell et al. | 144/287 |
| 5,694,864 A | * 12/1997 | Langewellpott | 108/145 |
| 5,697,411 A | * 12/1997 | Vandaele | 144/286.5 |
| 5,819,626 A | 10/1998 | Lucas | 83/489 |
| 6,075,502 A | * 6/2000 | McDowall et al. | 345/156 |

* cited by examiner

Primary Examiner—Allen Ostrager
Assistant Examiner—Shelley Self
(74) Attorney, Agent, or Firm—Marger, Johnson & McCollom, P.C.

(57) ABSTRACT

Out-feed support apparatus for use with frame-mounted work-piece cutting equipment having a height-adjustable work-piece support is described. The apparatus comprises a frame-mounted pulley, an elongate generally planar work-piece out-feed support mechanism extending distally from the support. The proximal end of the support mechanism is attached to the support. Additionally, the apparatus has an articulating mechanism extending between the floor and the support mechanism. The articulating mechanism is articulable to extend the effective height of the articulating mechanism by pivotal movement between the upper and lower arms thereof. The articulating mechanism further includes a first pivotal mount for attachment to the first mounting bracket and a second pivotal mount for pivotally connecting the upper and lower arms. The apparatus also has a cable having a proximal end fixedly attached to and extending from the support. The cable extends around the pulley, and the cable has a distal end operatively pivotally connected to the second pivotal mount. Height-adjustment of the work-piece support produces approximately equal height-adjustment of the proximal end and the distal region of the support mechanism.

18 Claims, 3 Drawing Sheets

SELF-LEVELING SEMI-AUTO-ELEVATING WORK-PIECE FEED SUPPORT MECHANISM FOR USE WITH A HEIGHT-ADJUSTABLE WORK SUPPORT IN A FRAME-MOUNTED SAW OR THE LIKE

BACKGROUND OF THE INVENTION

The present invention relates to frame-mounted saws, planers and the like, and the out-feed of work-pieces. More particularly, it concerns a feed support mechanism for supporting a fed-through work-piece as it enters or exits the frame-mounted work area.

SUMMARY OF THE INVENTION

The present invention provides out-feed support apparatus for use with frame-mounted work-piece cutting equipment. The apparatus has a height-adjustable work-piece support. The cutting equipment is configured for resting on a floor.

According to the preferred embodiments of the present invention, the apparatus comprises a frame-mounted pulley and an elongate generally planar work-piece out-feed support mechanism extending distally from the support. The support mechanism has a distal region and a proximal end. The proximal end is attached to the support. The support mechanism further includes a first mounting bracket in its distal region.

Additionally, the apparatus has an articulating mechanism extending between the floor and the distal region of the support mechanism. The articulating mechanism includes upper and lower pivotally hinged arms forming an acute or obtuse angle therebetween that faces the pulley mechanism. The articulating mechanism is articulable to extend the effective height of the articulating mechanism by pivotal movement between the upper and lower arms thereof. The articulating mechanism further includes a first pivotal mount for attachment to the first mounting bracket and a second pivotal mount for pivotally connecting the upper and lower arms.

The apparatus also has a cable having a proximal end fixedly attached to and extending from the support. The cable extends around the pulley with a generally downwardly horizontal extent terminating in a distal end operatively pivotally connected to the second pivotal mount. Height-adjustment of the work-piece support produces approximately equal height-adjustment of the proximal end and the distal region of the support mechanism.

According to one embodiment, the articulating mechanism further includes a first fixedly connected elongate member extending proximally from a vicinity of the arms toward the pulley, a distal end of the first member being pivotally connected to a region of the arms in the vicinity of the second pivotal mount, the distal end of the cable being pivotally connected to a proximal end of the first member.

DETAILED DESCRIPTION OF THE INVENTION

Figure 1:
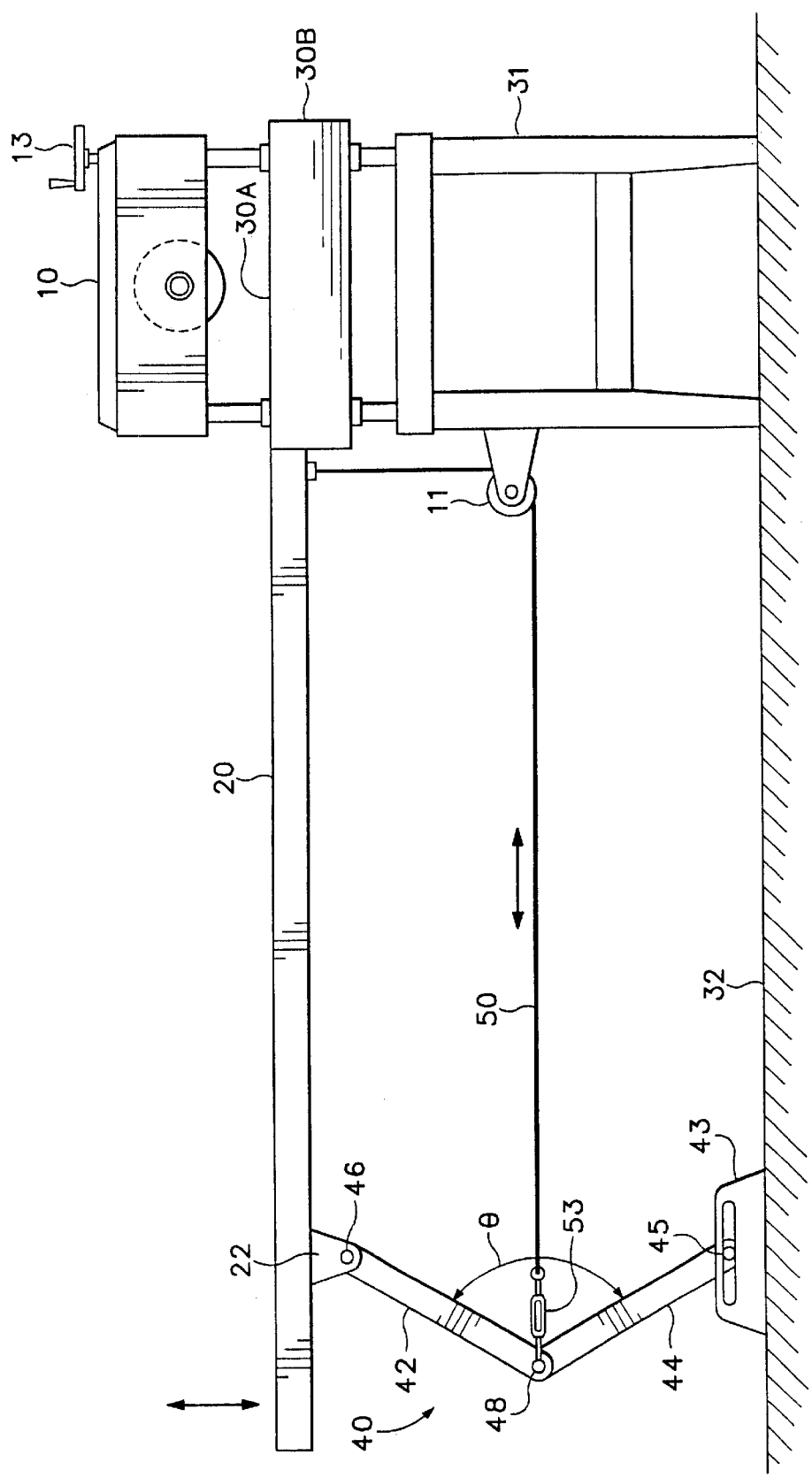
FIG. 1 is a side elevational view of the invented work-piece feed support mechanism in accordance with one preferred embodiment thereof.

Referring first to FIG. 1, a side elevational view of the invented out-feed support mechanism in accordance with a first embodiment of the invention is illustrated.

Reference first will be made to the conventional components of a frame-mounted saw or planer. A conventional working head 10, e.g. a saw, planer, is frame-mounted, with a vertically adjustable, carriage-mounted work-piece support surface 30A beneath a fixed head 10 that mounts the saw, planer, etc. (represented only schematically herein as a cylinder). The work-piece support surface 30A beneath the fixed-height saw or plane may be raised and lowered by hand, as by turning a wheel 13 that drives a worm screw (not shown) mounted between the work-piece support surface 30A and a frame 31. (The cutting head is fixedly frame-mounted above a carriage 30B.) The wheel 13 is aligned with the leg of the frame 31 to properly raise and lower the carriage 30B. The problem is that longer work-pieces need a longer out-feed (and/or in-feed) surface so that the finished work-piece does not bend and possibly break as it exits the carriage. Previously, only relatively short (e.g. 1 foot long) out-feed shelves have been fixedly bolted onto the carriage 30B.

It will be appreciated that the invention is useful with any frame-mounted work piece cutting equipment including a height-adjustable work-piece support piece, i.e. the equipment having a relatively fixed working head 10, a relatively moveable carriage 30B and an in-feed and/or an out-feed area for a work-piece, e.g., a length of lumber.

The invention in two preferred embodiments provides an elongate, self-leveling, semiautomatic-elevating in-feed or out-feed support mechanism 20, e.g. an out-feed table, a proximal end of which is affixed to the carriage 30B, e.g. by one or more bolts and nuts (not shown). The support mechanism 20 is preferably generally planar. A pulley 11 is mounted for rotation to the frame 31 that mounts the working head (cutting head), e.g. a circular saw, planer or the like. The support mechanism 20 extends distally from the carriage 30B with its upper surface substantially co-planar with support surface 30A. The support mechanism 20 has a distal region and a proximal end. The proximal end is preferably fixedly attached to carriage 30B, with its upper planar surface substantially co-planar with the support surface 30A, for the sake of rigidity and planar contiguity. The support mechanism 20 includes a first mounting bracket 22 in its distal region.

According to preferred embodiments of the present invention, an articulating mechanism 40 extends between a floor 32 and the support mechanism 20. Further, the articulating mechanism 40 includes upper and lower pivotally hinged arms 42, 44. The articulating mechanism 40 is articulable to extend the effective height of the articulating mechanism by pivotal movement between the upper and lower arms 42, 44 thereof. The articulating mechanism 40 further includes a first pivotal mount 46, e.g. a hinge, for attachment to the first mounting bracket 22 and a second pivotal mount 48, e.g. a hinge, for pivotally connecting the upper and lower arms 42, 44. Articulating upper and lower arms 42, 44 form an acute or obtuse angle $0 \leq \theta \leq 180$ therebetween, the interior of which faces the pulley 11.

Particularly, at the distal end of the support mechanism 20, the upper end of the upper arm 42 is mounted on the first pivotal mount 46. Also, the lower end of the lower arm 44 is pivotally mounted to the floor 32 by a third pivotal mount 45 attached to an elongate mounting bracket 43 (the distal/ proximal position of which may be adjustable). At a central, hinged region of the arms 42, 44, a cable 50 is fastened on the second pivotal mount 48. The cable 50 extends proximally then vertically, around the pulley 11 and can be fastened to a height-adjustable work piece support, e.g. the carriage 30B or any height-adjustable mechanism attached thereto, e.g. the proximal end of support mechanism 20 (as shown). Particularly, the cable 50 has a proximal end attached to and extending from the proximal end of support mechanism 20 and a distal end operatively pivotally connected to the second pivotal mount 48 of the articulating mechanism 40 via a cable end adjustment 53, e.g., a threaded shaft or turnbuckle. It will be apparent a person skilled in the art that the cable end adjustment 53 is used to adjust the length of the cable 50 for nominally re-leveling the carriage 30B when adjusting the third pivotal mount 45.

Now, it may be seen that when the carriage 30B is raised, the cable 50 is advanced around the pulley 11, causing the arms 42, 44 to articulate such as to increase toward 180° the angle formed thereby. This causes the distal end of the support mechanism 20 to rise along with the carriage 30B.

With this structure of the present invention, height-adjustment of the work-piece support surface 30A produces approximately equal height-adjustment of the proximal end and the distal region of the support mechanism 20. Such level height-adjustment of support mechanism 20 is described as semi-automatic since it occurs automatically in response to manual height adjustment of the carriage 30B.

Those skilled in the art will appreciate that when the carriage 30B is lowered, the cable 50 retreats around the pulley 11 as the support mechanism 20 retreats towards the floor 32 under the force of gravity.

Proper dimensioning of the support mechanism 20 and the L-shaped arms 42, 44 provides that the distal end of the support mechanism 20 is raised and lowered—at substantially the same rate and to substantially the same extent as the proximal end of the support mechanism 20—when the carriage 30B is raised and lowered between its highest and lowest elevations.

Figure 3:
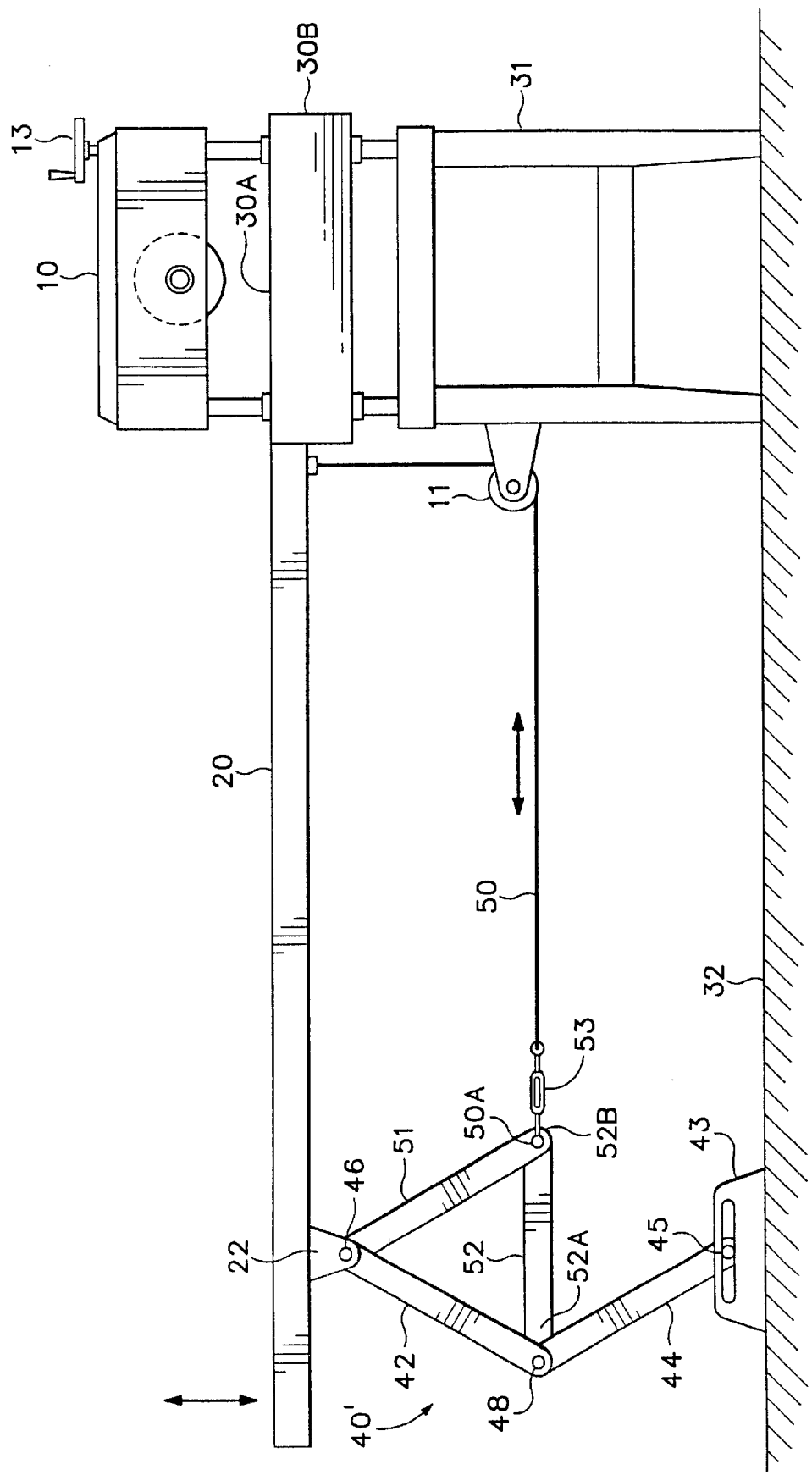
FIG. 3 is a side elevational view of the invented work-piece feed support mechanism in accordance with another preferred embodiment thereof.

In accordance with the preferred embodiments of the present invention, the support mechanism 20, the articulating mechanism 40 and the cable 50 extend upstream from the support surface 30A, thereby providing for work-piece in-feed support (as illustrated in FIGS. 1 and 3). Also, the support mechanism 20, the articulating mechanism 40 and the cable 50 extend downstream from the support surface 30A, thereby providing for work-piece out-feed support.

According to the preferred embodiments of the present invention, the cable 50 alternatively may be a rope or any other flexible but durable filament. Further, the articulable arms 42, 44 may be constructed of any suitable solid or perforated material, e.g. aluminum, steel or even plywood, or it may be of wire frame construction consistent with rigidity, durability and appropriate weight. Similarly, the in-feed or out-feed support mechanism 20 itself may be constructed in any desirable way for durability and light weight. Of course, the support mechanism 20 and articulating mechanism 40 must be of sufficient weight to overcome inertia and friction inherent in the articulating mechanism 40 and its pivotal mounts, so that the support mechanism 20 smoothly returns of its own weight when tension in the cable 50 is relieved. It will be appreciated that the cable-pulley and articulable arm configuration obtains the advantage of leverage that makes lifting the weight of the out-feed support mechanism 20 as easy as turning the carriage raise-lower wheel.

Figure 2:
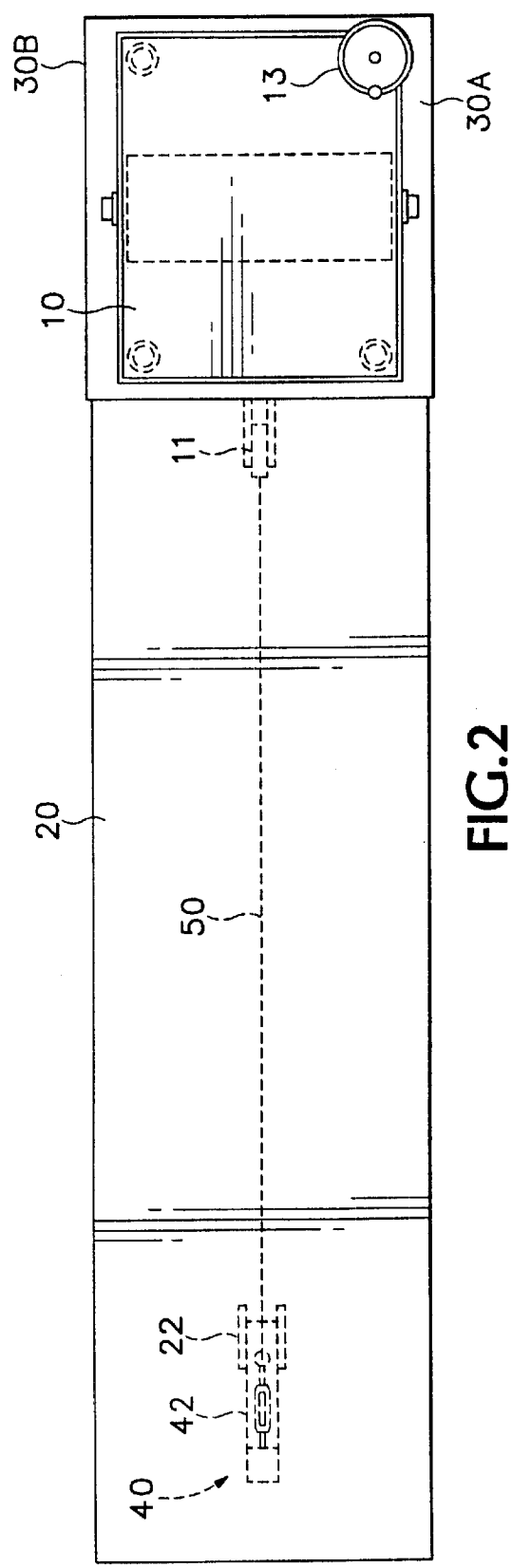
FIG. 2 is a top plan view of the invented work-piece feed support mechanism corresponding with the embodiment of FIG. 1.

FIG. 2 illustrates in top plan view the preferred embodiment of the invention, showing, for the sake of clarity, only certain features.

In FIG. 3, a side elevational view of an alternative embodiment of the invention is illustrated. Here, identical elements are identically designated, and similar elements are designated with a primed version of the identical reference designator found in FIG. 1.

The embodiment of FIG. 3 features articulable arms 42, 51 and 52 in a triangular configuration that improves elevational tracking between the distal end of the out-feed support mechanism 20 and the carriage 30B. Those of skill in the art will appreciate that the cable 50 can be operatively connected to the articulable arms 42, 44 at a point that is located proximal to the point of articulation, i.e. closer to the pulley 50. Proximally spacing the hinge point from the point of articulation further improves the dynamics of the in-feed or out-feed support mechanism 20, as will be described.

In accordance with the alternative preferred embodiment of the present invention shown in FIG. 3, an alternative articulating mechanism 40' further includes a first elongate member 52 fixedly attached to upper arm 42 and extending proximally from a vicinity of the joinder of the arms 42, 44 toward the pulley 11. In addition, a distal end 52A of the first member 52 is pivotally connected to a region of the arms 42, 44 in the vicinity of the second pivotal mount 48. In this alternative embodiment of articulating mechanism 40', the distal end 50A of the cable 50 is pivotally connected to a proximal end 52B of the first member 52.

Preferably, the articulating mechanism 40' further includes a second elongate member 51 fixedly attached to and extending between the first elongate member 52 and the upper arm 42. The distal end 52A of the first elongate member 52 can be connected to the second pivotal mount 48. More preferably, the upper arm 42 and the second elongate member 51 form two approximately equal legs of a substantially isosceles triangle. Most preferably, the upper arm 42, the first elongate member 52 and the second elongate member 51 form a substantially equilateral triangle.

The support mechanism 20 is generally planar and rectangular (as illustrated in FIGS. 1 or 3 and 2) and the upper arm 42, the second elongate member 51 and the lower arm 44 define a plane that is substantially normal to the plane of the support mechanism 20.

According to a preferred embodiment of the present invention, the upper and lower arms 42, 44 are of substantially equal length. Those of skill in the art, however, will appreciate that the dimensions and configurations of the arms and members may be different, yet within the spirit and scope of the invention.

According to another aspect of the preferred embodiments of the present invention, the mounting bracket 43 is elongated and is configured for fine adjustable positioning of the lower end of the lower arm 44 relative to the pulley 11 within the plane defined by the articulating mechanism 40.

Finally, those of skill in the art will appreciate that the invented apparatus described and illustrated herein may be implemented as described, or in any alternative, suitable form. Thus, alternative embodiments are contemplated, and are within the spirit and scope of the invention.

Having illustrated and described the principles of my invention in preferred embodiments thereof, it should be readily apparent to those skilled in the art that the invention can be modified in arrangement and detail without departing from such principles. I claim all modifications coming within the spirit and scope of the accompanying claims.

I claim:

1. Out-feed support apparatus for use with frame-mounted work-piece cutting equipment having a height-adjustable work-piece support, the cutting equipment being configured for resting on a floor, the apparatus comprising:
a frame-mounted pulley;
an elongate generally planar work-piece out-feed support mechanism extending distally from the support, the support mechanism having a distal region and a proximal end, the proximal end being attached to the support, the support mechanism further having a first mounting bracket in its distal region;
an articulating mechanism extending between the floor and the support mechanism, the articulating mechanism including upper and lower pivotally hinged arms, the articulating mechanism being articulable to extend the effective height of the articulating mechanism by pivotal movement between the upper and lower arms thereof, the articulating mechanism further including a first pivotal mount for attachment to the first mounting bracket and a second pivotal mount for pivotally connecting the upper and lower arms; and
a cable having a proximal end fixedly attached to and extending from the height-adjustable support, the cable extending around the pulley, and the cable having a distal end operatively pivotally connected to the second pivotal mount,
wherein height-adjustment of the work-piece support produces approximately equal height-adjustment of the proximal end and the distal region of the support mechanism.

2. The apparatus of claim 1, wherein the articulating mechanism further includes a first fixedly connected elongate member extending proximally from a vicinity of the arms toward the pulley, a distal end of the first member being pivotally connected to a region of the arms in the vicinity of the second pivotal mount, the distal end of the cable being pivotally connected to a proximal end of the first member.

3. The apparatus of claim 2, wherein the articulating mechanism further includes a second elongate member fixedly attached to and extending between the first elongate member and the upper arm, wherein the distal end of the first elongate member is connected to the second pivotal mount, and wherein the upper arm and the second elongate member form legs of a substantially isosceles triangle.

4. The apparatus of claim 3, wherein the support mechanism is generally planar and wherein the upper arm, the second elongate member and the lower arm define a plane that is substantially normal to the plane of the support mechanism.

5. The apparatus of claim 4, wherein the upper and lower arms are of substantially equal length.

6. The apparatus of claim 3, wherein the upper arm, the first elongate member and the second elongate member and the lower arm form a substantially equilateral triangle.

7. The apparatus of claim 6, wherein the upper and lower arms are of substantially equal length.

8. The apparatus of claim 2, wherein the upper and lower arms are of substantially equal length.

9. The apparatus of claim 1, wherein the support mechanism is generally planar and rectangular.

10. The apparatus of claim 1, wherein the support mechanism is generally planar and wherein the upper arm, the second elongate member and the lower arm define a plane that is substantially normal to the plane of the support mechanism.

11. The apparatus of claim 10, wherein a lower end of the lower arm is pivotally mounted to the floor by an elongate mounting bracket configured for the adjustable positioning of the lower end of the lower arm relative to the pulley within the plane defined by the articulating mechanism.

12. The apparatus of claim 1, wherein the articulating mechanism further includes a first fixedly connected elongate member extending proximally from a vicinity of the arms toward the pulley, a distal end of the first member being fixedly connected to a region of the upper arm in the vicinity of the second pivotal mount, the distal end of the cable being pivotally connected to a proximal end of the first member, and wherein the articulating mechanism further includes a second fixedly connected elongate member extending between the first elongate member and the upper arm, wherein the distal end of the first elongate member is connected to the upper arm in the region of the second pivotal mount, wherein the upper arm and the first elongate member form legs of a substantially isosceles triangle and the second elongate member forms a base thereof, and wherein the support mechanism is generally rectangular and wherein the upper arm, the second elongate member and the lower arm define a plane that is substantially normal to the plane of the support mechanism.

13. The apparatus of claim 12, wherein the upper and lower arms are of substantially equal length.

14. The apparatus of claim 13, wherein a lower end of the lower arm is pivotally mounted to the floor by an elongate mounting bracket configured for the adjustable positioning of the lower end of the lower arm relative to the pulley within the plane defined by the upper and lower arms.

15. Feed support apparatus for use with frame-mounted work-piece cutting equipment having a height-adjustable work-piece support, the cutting equipment being configured for resting on a floor, the apparatus comprising:
a frame-mounted pulley;
an elongate generally planar work-piece feed support mechanism extending distally from the support, the support mechanism having a distal region and a proximal end, the proximal end being attached to the support, the support mechanism further having a first mounting bracket in its distal region;
an articulating mechanism extending between the floor and the support mechanism, the articulating mechanism including upper and lower pivotally hinged arms of substantially equal length, the articulating mechanism being articulable to extend the effective height of the articulating mechanism by a pivoting movement between the upper and lower arms thereof, the articulating mechanism further including a first pivotal mount for attachment to the first mounting bracket and a second pivotal mount for pivotally connecting the upper and lower arms, wherein the articulating mechanism further includes a first elongate member fixedly connected to the upper arm and extending proximally from a vicinity of the arms toward the pulley, a distal end of the first member being pivotally connected to a region of the arms in the vicinity of the second pivotal mount, the distal end of the cable being pivotally connected to a proximal end of the first member, and wherein the articulating mechanism further includes a second fixedly connected elongate member extending between the first elongate member and the upper arm, wherein the distal end of the first elongate member is connected to the upper arm in the vicinity of the second pivotal mount, wherein the upper arm and the first elongate member form legs of a substantially isosceles triangle and the second elongate member forms a base thereof, the upper arm and the second elongate member and the lower arm defining a plane that is substantially normal to the plane of the support mechanism; and a cable having a proximal end fixedly attached to and extending from the support, the cable extending around the pulley, and the cable having a distal end operatively pivotally connected to the second pivotal mount, wherein height-adjustment of the work-piece support produces substantially equal height-adjustment of the proximal end and the distal region of the support mechanism.

16. The apparatus of claim 15, wherein the support mechanism, the articulating mechanism and the cable extend upstream from the support, thereby providing for work-piece in-feed support.

17. The apparatus of claim 15, wherein the support mechanism, the articulating mechanism and the cable extend downstream from the support, thereby providing for work-piece out-feed support.

18. The apparatus of claim 15, wherein a lower end of the lower arm is pivotally mounted to the floor by an elongate mounting bracket configured for the adjustable positioning of the lower end of the lower arm relative to the pulley within the plane defined by the articulating mechanism.

* * * * *